(12) United States Patent
Frens (10) Patent No.: US 8,579,448 B2
(45) Date of Patent: Nov. 12, 2013

(54) POINTER STRUCTURE OF AN INSTRUMENT CLUSTER

(75) Inventor: Jonathan M. Frens, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 46 days.

(21) Appl. No.: 12/692,743

(22) Filed: Jan. 25, 2010

(65) Prior Publication Data

US 2011/0182052 A1    Jul. 28, 2011

(51) Int. Cl.
 *G01D 11/28* (2006.01)
(52) U.S. Cl.
 USPC ......... 362/23.21; 362/471; 362/489; 362/488
(58) Field of Classification Search
 USPC ............. 362/23, 26–28, 471, 488, 489, 30; 116/288, 286, 284, 62.1–62.3, 47, 48, 116/37; 340/815.42
 See application file for complete search history.

(56) References Cited

U.S. PATENT DOCUMENTS

| | | | | |
|---|---|---|---|---|
| 2,603,129 A * | 7/1952 | Dreyer | ............................ | 359/437 |
| 4,274,358 A * | 6/1981 | Nakamura et al. | ............. | 116/288 |
| 4,628,262 A * | 12/1986 | Maudsley | ....................... | 324/309 |
| 5,130,548 A * | 7/1992 | Sano et al. | ................... | 250/461.1 |
| 5,205,635 A | 4/1993 | Van Order et al. | | |
| 5,803,240 A | 9/1998 | Swidersky et al. | | |
| 5,911,492 A * | 6/1999 | Perry et al. | ........................ | 362/26 |
| 6,032,608 A * | 3/2000 | Oreans et al. | .................. | 116/288 |
| 6,417,779 B1 | 7/2002 | Noll et al. | | |
| 6,596,667 B2 * | 7/2003 | Bellussi et al. | ................ | 502/332 |
| 6,598,988 B1 | 7/2003 | Noll et al. | | |
| 6,817,310 B2 | 11/2004 | Sugiyama et al. | | |
| 7,098,897 B2 | 8/2006 | Vakil et al. | | |
| 7,221,363 B2 | 5/2007 | Roberts et al. | | |
| 2002/0001183 A1 * | 1/2002 | Shigehiro | ......................... | 362/23 |
| 2004/0114340 A1 * | 6/2004 | Birman et al. | ................... | 362/23 |

(Continued)

FOREIGN PATENT DOCUMENTS

| | | |
|---|---|---|
| DE | 839104 C | 5/1952 |
| DE | 3149826 A1 | 7/1983 |

(Continued)

OTHER PUBLICATIONS

U.S. Appl. No. 12/521,846, filed Jan. 4, 2008, Pierce et. al.

(Continued)

*Primary Examiner* — Evan Dzierzynski
*Assistant Examiner* — Danielle Allen
(74) *Attorney, Agent, or Firm* — The Dobrusin Law Firm, PC (57) ABSTRACT

Instrument cluster and pointing device for a car or other vehicle, the pointing device being mounted rotatable about a rotation axis and having a shaft element in the vicinity of the rotation axis, the pointing device further comprising at least one of a light guide element or a mirror element in the region of the shaft element and comprising one of an image forming element or an aperture, wherein the one of the image forming element or the aperture and the one of the light guide element or the mirror element are able to be rotated about the rotational axis with the shaft element, and wherein light incident to the shaft element is directed from the one of the light guide element or the mirror element to the image forming element or aperture and projecting to a visible surface.

7 Claims, 5 Drawing Sheets

(56) References Cited

U.S. PATENT DOCUMENTS

| | | |
|---|---|---|
| 2005/0052426 A1 | 3/2005 | Hagermoser et al. |
| 2005/0103254 A1* | 5/2005 | Birman et al. ................ 116/288 |
| 2005/0134485 A1 | 6/2005 | Hein et al. |
| 2006/0035073 A1 | 2/2006 | Funkenbusch et al. |
| 2006/0132383 A1 | 6/2006 | Gally et al. |
| 2009/0180272 A1* | 7/2009 | Tsurumi et al. ................ 362/28 |
| 2010/0058976 A1 | 3/2010 | Mayer et al. |

FOREIGN PATENT DOCUMENTS

| | | |
|---|---|---|
| DE | 4321146 A1 | 1/1995 |
| DE | 19544578 A1 | 6/1997 |
| DE | 19737679 A1 | 3/1999 |
| DE | 19739628 A1 | 3/1999 |
| DE | 19831893 A1 | 1/2000 |
| DE | 20021111 U1 | 1/2001 |
| DE | 10134365 A1 | 1/2003 |
| DE | 102005003919 A1 | 9/2005 |
| DE | 102005055906 A1 | 5/2007 |
| EP | 1758070 A2 | 2/2007 |
| EP | 1839945 A1 | 10/2007 |
| EP | 2110834 A1 | 10/2009 |
| FR | 2679988 A1 | 2/1993 |
| FR | 2871230 A1 | 12/2005 |
| JP | 2003014508 A | 1/2003 |
| WO | 2004/102127 A1 | 11/2004 |
| WO | 2006/002474 A1 | 1/2006 |
| WO | 2006/005821 | 1/2006 |
| WO | 2008/086215 A2 | 7/2008 |
| WO | 2008/131305 A1 | 10/2008 |
| WO | 2009/150546 A2 | 12/2009 |
| WO | 2010/025160 A1 | 4/2010 |

OTHER PUBLICATIONS

U.S. Appl. No. 12/691,093, filed Jan. 21, 2010, Daurelle et. al.
U.S. Appl. No. 12/528,214, filed Aug. 21, 2009, Mayer.

* cited by examiner

POINTER STRUCTURE OF AN INSTRUMENT CLUSTER

BACKGROUND

The present disclosure relates generally to the field of display apparatus, and particularly to instrument clusters for cars and other vehicles. More specifically, this disclosure relates to the lighting of pointers inside of an instrument cluster of a vehicle.

Instrument clusters for vehicles often include an instrument panel that includes a pointer. The pointer is typically configured to point to some value of a vehicle parameter or other parameter such as fuel level, vehicle speed, preferred or preset vehicle speed, engine speed, engine temperature, time, etc. In many cases, the pointer can be rotated about a rotational axis and is in many cases connected to a stepper motor by means of a rotating shaft. The pointer generally comprises an axial portion extending substantially parallel to the rotational axis about which the pointer can be rotated. The pointer generally further comprises a radial portion extending substantially in a direction perpendicular to the axial portion and perpendicular to the rotational axis.

It has become popular to light the pointer using light sources such as LEDs (light emitting diodes). In general, LEDs might be arranged around the outside of the shaft. As the pointer moves around the rotational axis, the pointer would be lit by subsequent LEDs around the shaft. Light from the LEDs would enter the pointer and make the pointer appear as if it were glowing. According to other solutions, one or a plurality of LEDs are located behind the center of the shaft such as to directly inject light into the shaft.

With these current instrument cluster configurations, the pointer usually comprises a light guide element such that the light emitted by the LED or plurality of LEDs is guided by the light guide and directly emitted towards a user such that there is only one appearance of the pointer.

There remains a continuing need to provide a more cost effective manufacture and assembly process of instrument cluster elements and to provide for an enhanced visibility of the pointer and the position of the pointer such that an enhanced clarity of the displayed information can be achieved.

SUMMARY

The present invention overcomes the disadvantages of the prior art by providing a design for a pointer or a pointer device for an instrument cluster of a car or other vehicle, wherein the pointing device is mounted rotatable about a rotation axis, wherein the pointing device has a shaft element in the vicinity of the rotation axis, wherein the pointing device further comprises at least one of a light guide element or a mirror element in the region of the shaft element, wherein the pointing device further comprises one of an image forming element or an aperture, wherein the one of the image forming element or the aperture and the one of the light guide element or the mirror element are able to be rotated about the rotational axis with the shaft element, and wherein light incident to the shaft element is directed from the one of the light guide element or the mirror element to the image forming element or aperture.

With the pointing device according to the present invention, it is possible to provide a further pointing effect of the pointing device by the use of a projected image formed by the image forming element or the aperture, the image being reflected by a region of the appliqué of the instrument cluster towards the user of the pointing device.

The pointing device according to the present invention comprises one of a light guide element or a mirror element in the region of the shaft of the pointer device. The light guide element preferably emits (or the mirror element reflects) light towards one of an image forming element or an aperture. The light emitted by the light guide element or reflected by the mirror element is projected (through the image forming element or aperture) to a part of the display surface visible to the driver of the vehicle or to the user of the instrument cluster. The display surface is preferably a formed appliqué surface of the instrument cluster according to the present invention.

It is particularly preferred according to the present invention that light incident to the shaft element is visible to a user of the instrument cluster only after having passed one of the image forming element or the aperture and reflecting on the appliqué. It is particularly preferred that the projection of light to a part of the display surface is operational or visible to the driver of the vehicle or to the user of the instrument cluster only in certain lighting conditions, especially during night lighting conditions, i.e. reduced ambient lighting from the exterior of the vehicle, especially in the form of sunlight. Such reduced ambient lighting conditions are usually relevant during night time but also within tunnels or underbridges.

Very preferably, the pointing device comprises one of a covering element or a shroud. This serves to prevent light incident to the shaft element from being reflected or otherwise ejected from the intended optical path within the pointing device so that light incident to the shaft element is prevented from being reflected in the direction to the driver or the user of the pointing device.

According to a preferred embodiment of the present invention, the pointing device further comprises a focusing element, wherein the focusing element is able to be rotated about the rotational axis together with the shaft element, and wherein incident light is directed from the one of the image forming element or the aperture to the focusing element.

By means of the focusing element, especially a focusing lens, the light emitted by the light guide element or reflected by the mirror element is projected (through the image forming element or aperture) to a part of the display surface visible to the driver of the vehicle or to the user of the instrument cluster. The display surface is preferably a formed appliqué surface of the instrument cluster according to the present invention.

According to all embodiments of the present invention, it is preferred that the one of the light guide element or the mirror element is integrally formed with (or integrated in) the shaft element and/or that the one of the image forming element or the aperture is integrally formed with (or integrated in) the one of the light guide element or the mirror element and/or that the one of the image forming element or the aperture and the one of the light guide element or the mirror element are integrally formed with (or integrated in) the shaft element and/or that the focusing element is integrally formed with (or integrated in) the one of the image forming element or the aperture and/or that the focusing element and the one of the image forming element or the aperture are integrally formed with (or integrated in) the one of the light guide element or the mirror element.

Such integrally forming (or integrating) of different elements of the pointing devices allows for a more simple construction of the pointing device and a less cost intensive construction and assembly of the pointing device.

Another object of the present invention relates to an instrument cluster of a car or other vehicle, wherein the instrument cluster comprises a pointing device, wherein the pointing device is mounted rotatable about a rotational axis, wherein the pointing device has a shaft element in the vicinity of the rotation axis, wherein the pointing device further comprises at least one of a light guide element or a mirror element in the region of the shaft element, wherein the pointing device further comprises one of an image forming element or an aperture, wherein the one of the image forming element or the aperture and the one of the light guide element or the mirror element is able to be rotated about the rotational axis together with the shaft element, and wherein light incident to the shaft element is directed from the one of the light guide element or the mirror element to the image forming element or aperture.

With the instrument cluster according to the present invention, it is possible to provide a further pointing effect of the pointing device by the use of a projected image formed by the image forming element or the aperture, the image being reflected by a region of the appliqué of the instrument cluster towards the user of the pointing device.

It is preferred according to the present invention that the light incident to the shaft element is visible to a user of the instrument cluster only after having passed one of the image forming element or aperture and reflecting on the appliqué.

DETAILED DESCRIPTION

Figure 1:
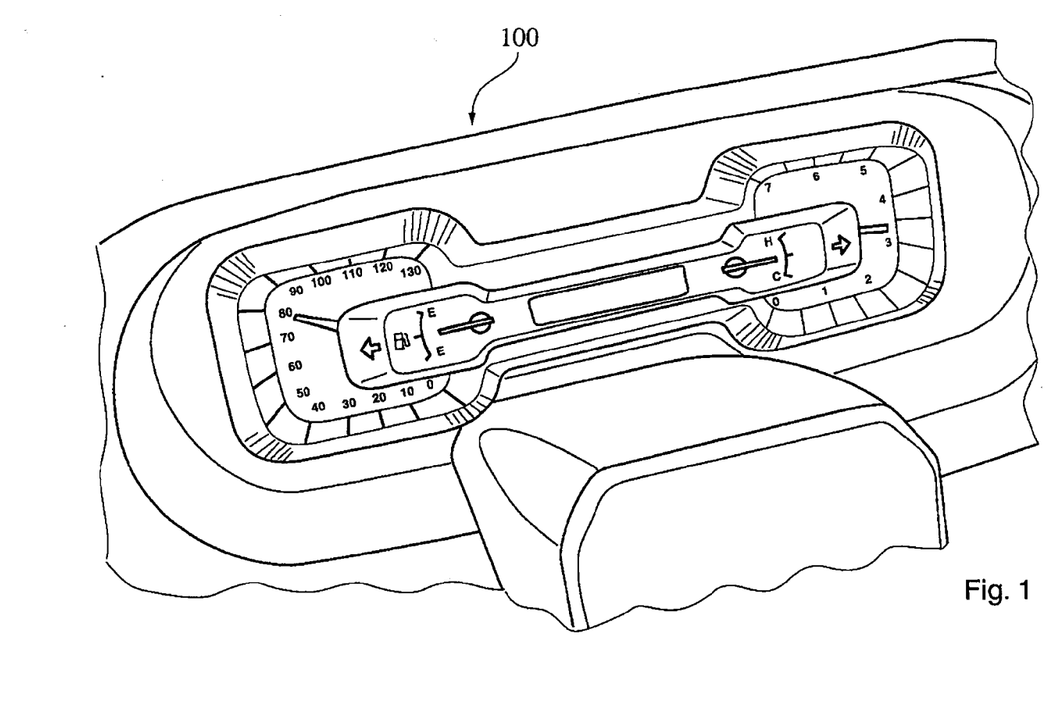
FIG. 1 is a perspective view of the interior of a vehicle having an instrument cluster schematically shown.

Referring generally to the figures and in particular to FIG. 1, a vehicle interior is partly shown according to an exemplary embodiment. The vehicle interior includes an instrument cluster 100 for providing information regarding vehicle parameters such as fuel level, vehicle speed, engine speed, engine temperature, etc. Preferably, the vehicle interior usually also comprises a steering wheel (not shown) or another steering device ergonomically located so as to allow for a fatigue-proof usage by a driver or another user of the vehicle.

Figure 2:
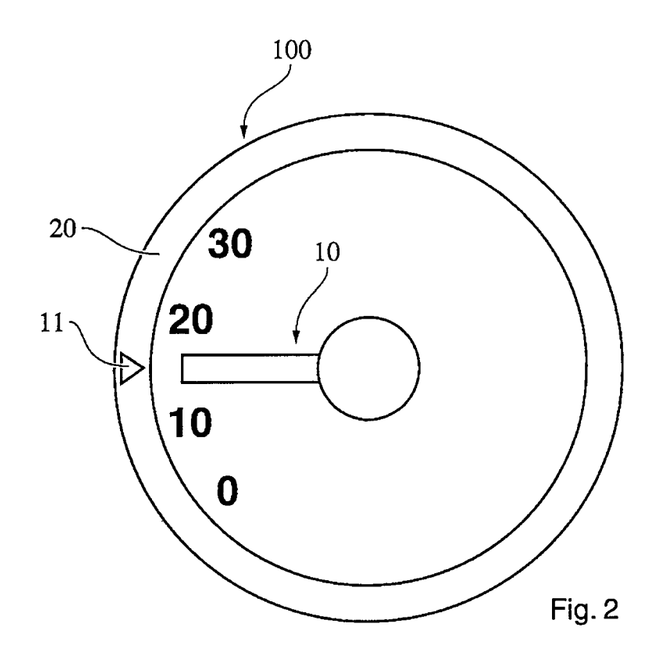
FIG. 2 is a top view on a display surface of an instrument cluster of a vehicle according to an exemplary embodiment.

Referring to FIG. 2, a pointer system or pointer device 10 for an instrument cluster 100 (or cluster) is shown together with a display surface 20 of the instrument cluster 100. FIG. 2 shows a top view of the instrument cluster 100. The pointer system 10 or pointing device 10 according to the present invention provides a projected light image 11. The projected light image 11 of the pointer system is shown in FIG. 2 on a left hand part of the instrument cluster 100 or cluster display surface 20. The display surface 20 is the surface which can be normally seen by the driver or user of the instrument cluster 100. In FIG. 2, a display graduation is schematically shown on the left hand side of the display surface 20 in the vicinity of the projected light image 11. By means of the projected light image 11 being in the vicinity of the graduation (or other symbolic indication on the display surface), it is possible for the driver to see the value of the vehicle parameter by means of the location of the projected light image 11. The projected light image 11 can have any form or shape, e.g. round, rectangular, triangular, elongated or the like. In the example shown in FIG. 2, the projected light image 11 has a triangular shape (or an arrow like shape) such as to point to a certain part of the graduation in order to display the value of the vehicle parameter.

Figure 3:
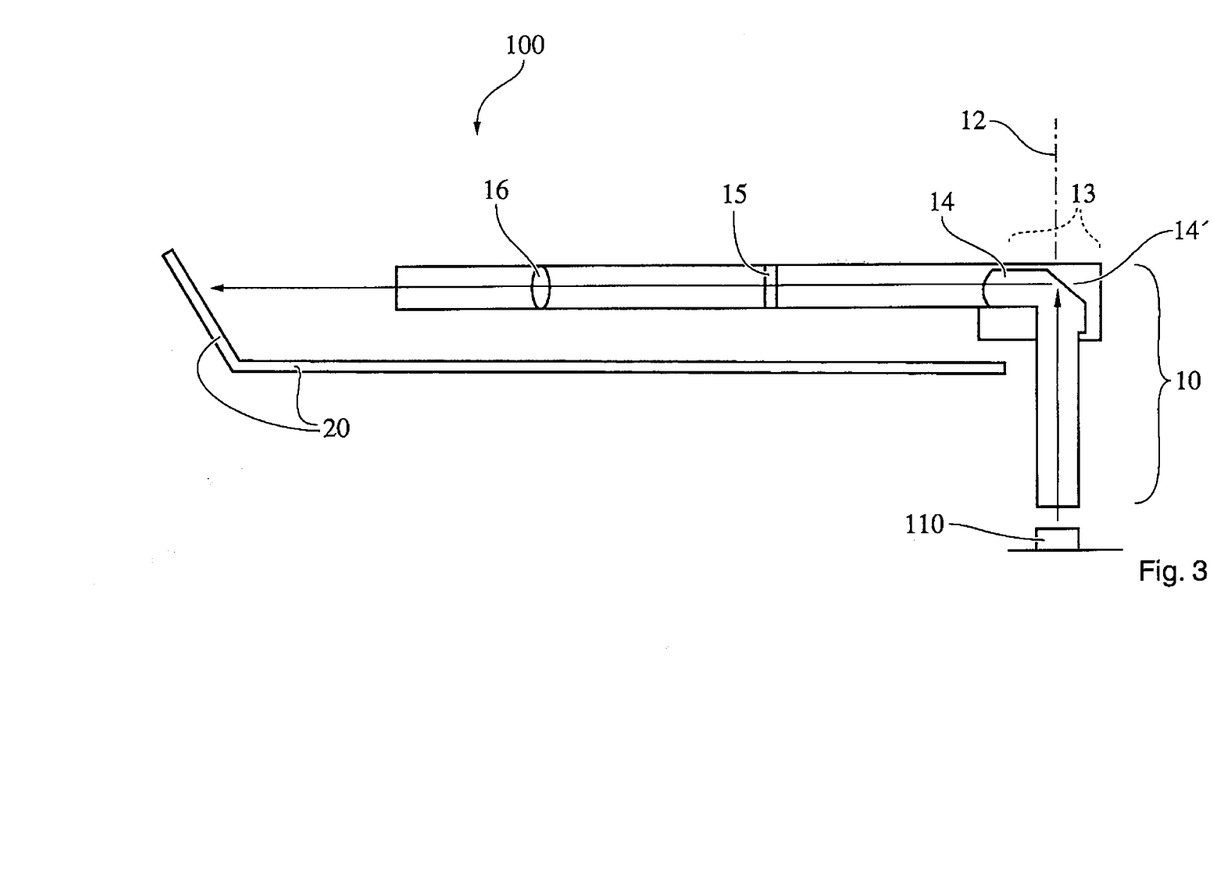
FIG. 3 is a sectional view of the instrument cluster of a vehicle according to the exemplary embodiment.

In FIG. 3, a sectional view of the instrument cluster 100 according to the exemplary embodiment is shown. The direction of view of FIG. 3 is parallel to the plane of the main extension of the display surface 20, i.e. substantially orthogonal to the direction of a rotational axis 12 of the pointing device 10. The pointing device 10 comprises a shaft element 13. The shaft element 13 extends substantially along the axis of rotation 12 of the pointer 10 or pointing device 10.

Furthermore, the pointing device 10 comprises one of a light guiding element 14 or a mirror element. The light guiding element 14 can be provided such that a surface 14' serves as a mirror (where total reflection occurs). Alternatively, a mirror element (not shown), e.g. a metallized surface at the location of the surface 14', can be used in the context of the present invention. The one of the light guiding element 14 or the mirror element serves to direct light emitted by an LED 110 (emitting light which is incident to the shaft element 13 of the pointing device 10) towards one of an image forming element 15 or an aperture. The image forming element 15 is preferably provided as an image aperture. The image forming element 15 or image aperture moves together with the pointing device 10, i.e. follows the rotational movement of the pointing device, i.e. of the shaft element 13. Preferably, the pointing device 10 also comprises a focusing element 16. The focusing element 16 also moves together with the pointing device 10, i.e. follows the rotational movement of the pointing device, i.e. of the shaft element 13. From the focusing element 16, the light is projected towards the display surface 20. According to all embodiments of the present invention, the focusing element 16 is preferably provided as a focusing lens.

Preferably, the functions of the shaft element 13 and of the light guiding element 14 are integrated in the same element, i.e. the shaft is provided by a light guiding material and is preferably shaped such as to be able to guide the incident light (received from the LED 110 or from a plurality of LEDs (axially) behind the shaft element 13 of the pointing device 10) in a direction towards the image forming element 15.

According to an alternative embodiment of the present invention, the one of the image forming element 15 or the aperture can also be integrated in the shaft element 13 of the pointing device 10 and/or in the one of the light guiding element 14 or mirror element.

According to a further alternative embodiment of the present invention, the focusing element 16 can also be integrated in the shaft element 13 of the pointing device 10 and/or in the one of the light guiding element 14 or mirror element.

According to still a further alternative embodiment of the present invention, the focusing element 16 can also be integrated together with the one of the image forming element 15 or the image aperture. This integration can be provided such that the integrated focusing element and image forming element are provided (radially) spaced from the shaft element 13 or integrated in the shaft element 13 or near the shaft element 13 of the pointing device 10.

Figure 4:
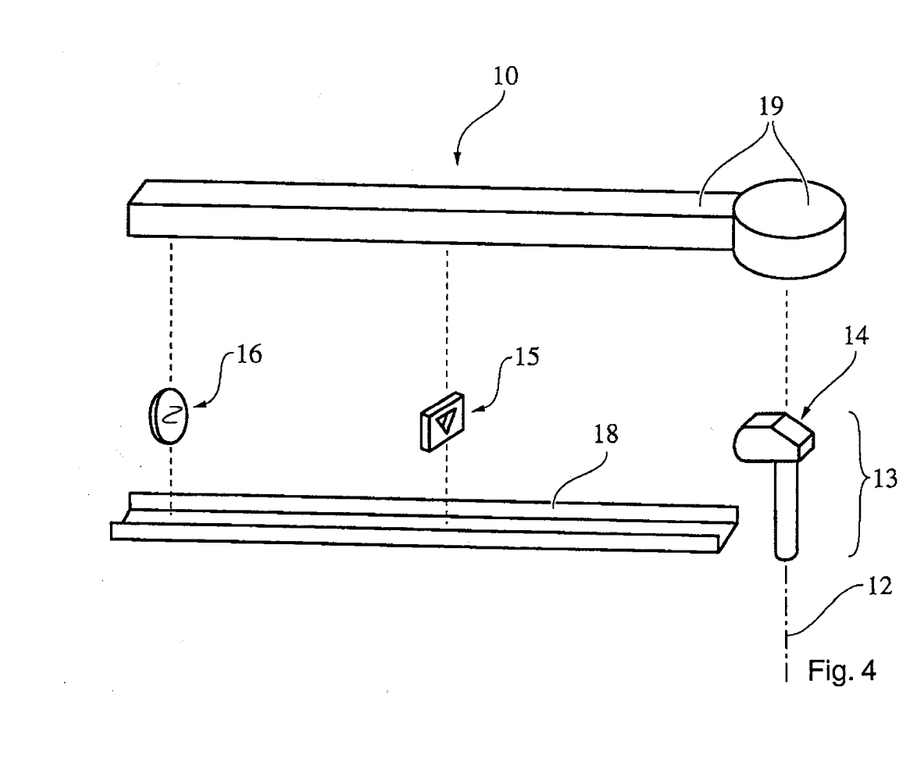
FIG. 4 is an exploded view of the pointer of the instrument cluster according to the exemplary embodiment.

FIG. 4 shows an exploded view of an exemplary embodiment of the pointing device 10 of the instrument cluster 100 according to the present invention. In this embodiment, the pointing device 10 comprises, besides the shaft element 13 or pointer stem, a carrier 18 and a top shroud 19. The carrier 18 and the top shroud 19 extend substantially along the radial direction of the pointing device 10. Between the carrier 18 and the top shroud 19, the image forming element 15 or image aperture as well as the focusing element 16 or focusing lens are located. Both the carrier 18 and top shroud 19 (or cover element) serve to mechanically secure the focusing element 16 and the image forming element 15 with respect to the pointer shaft or shaft element 13 during the rotational movement of the pointing device 10 about the rotational axis 12, i.e. between different rotational positions of the pointing device 10 according to the present invention.

Preferably, the top shroud 19 is not backlit. This means that the top shroud 19 is only visible during daylight lighting conditions inside the vehicle and that the driver or user of the pointing device 10 does not or at least not precisely see the position of the pointer during nighttime lighting conditions, except by means of the projected image 11 visible on the display surface 20.

Figure 5:
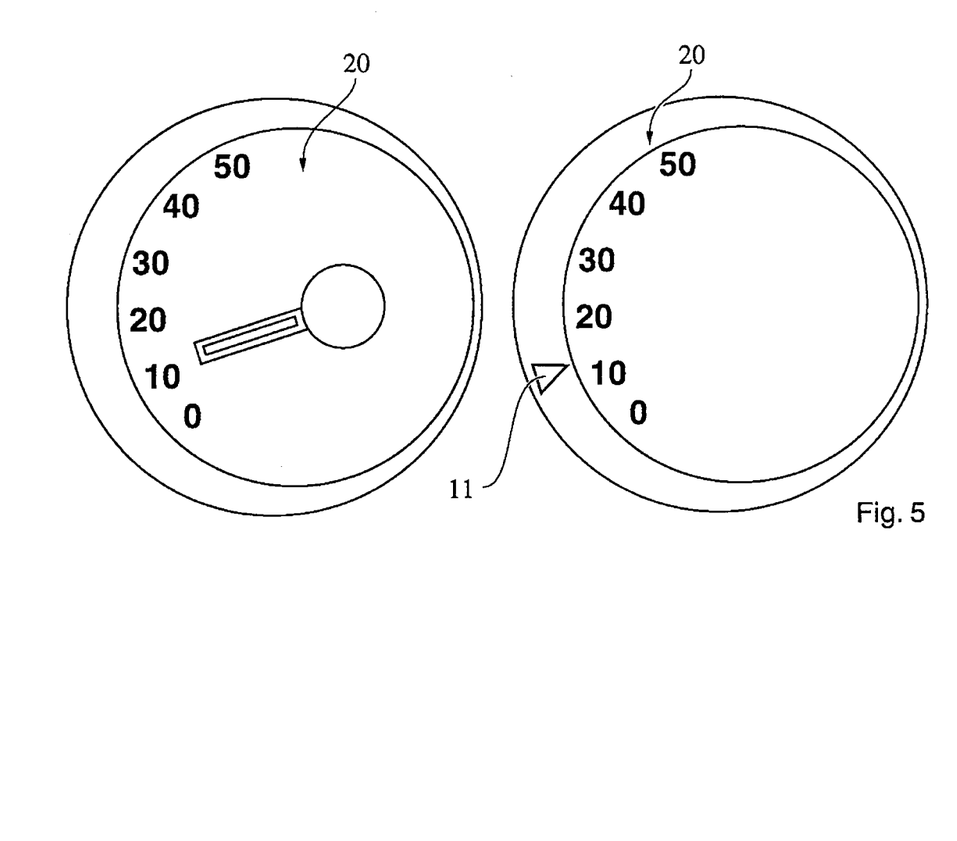
FIG. 5 shows two top views according to different lighting conditions on a display surface of the instrument cluster of a vehicle according to the exemplary embodiment.

FIG. 5 shows two top views according to different lighting conditions on a display surface 20 of the instrument cluster 100 according to the exemplary embodiment of the present invention. The appearance of the instrument cluster 100 with the pointing device 10 according to the present invention which corresponds to daytime lighting conditions, i.e. illuminated lighting conditions, is shown on the left hand side of FIG. 5. The appearance of the instrument cluster 100 with the pointing device 10 according to the present invention which corresponds to nighttime lighting conditions, i.e. non-illuminated lighting conditions, is shown on the right hand side of FIG. 5. From the nighttime appearance of the instrument cluster (right hand side of FIG. 5), it can be seen that the pointing device 10 is not visible or at least not very well visible or at least not actively backlit with regard to the pointer stem or pointer shaft (shaft element 13) as well as with regard to the radial part of the pointing device 10 (i.e. the part of the pointer which extends along a substantially radial direction with respect to the rotational axis 12). However, from the nighttime appearance, it is visible that the image 11 (or projected image 11) of the image forming element 15 is projected on the display surface 20 such that the position of the pointing device 10 can easily be detected by a driver of the vehicle or a user of the instrument cluster 100. During nighttime appearance of the pointing device 10, there is preferably a backlit graphics visible on the display surface 20. In order to realize such a backlit graphics, preferably further light sources, like further LEDs, are provided in the instrument cluster 100, especially behind at least a part of the display surface 20. From the daytime appearance, it can be seen from FIG. 5 (cf. left hand side of FIG. 5) that the pointer stem or pointer shaft (shaft element 13) as well as the radial part of the pointing device 10 (i.e. the part of the pointing device 10 which extends along a substantially radial direction with respect to the rotational axis 12) is very well detectable such that the position of the pointing device 10 can easily be seen by the driver of the vehicle or the user of the instrument cluster.

According to an alternative embodiment of the present invention, the projected image can always be lit, i.e. in both modes of operation of the instrument cluster, which means that the LED 110 emitting light towards the shaft element 13 is illuminated both during daytime mode of operation and during nighttime mode of operation.

According to another alternative embodiment of the present invention, the projected image 11 can be lit only in the mode of operation of the instrument cluster relating to the nighttime appearance or during nighttime mode. In this alternative embodiment, it is possible to save energy that would otherwise be needed to illuminate the LED.

The invention claimed is:

1. Pointing device for an instrument cluster of a car or other vehicle, wherein the pointing device is mounted rotatable about a rotation axis, wherein the pointing device has a shaft element in the vicinity of the rotation axis, wherein the pointing device further comprises at least one light guide element in the region of the shaft element, wherein the pointing device further comprises an image forming element, wherein the image forming element and the light guide element are able to be rotated about the rotational axis with the shaft element, wherein light incident to the shaft element is directed from the at least one light guide element to the image forming element, wherein the pointing device further comprises an opaque covering element, wherein a light image is formed by light incident to the shaft element passing from the light guide element through the image forming element, wherein light incident to the shaft element is visible to a user of the instrument cluster only after the light image is formed, and projected from the pointing device, reflected by an appliqué towards the user; wherein the pointing device further comprises a focusing element, wherein the focusing element is able to be rotated about the rotational axis together with the shaft element, and wherein incident light is directed from the one of the image forming element to the focusing element before the light image is projected from the pointing device, the image forming element and the one of the light guide element are integrally formed with the shaft element and the focusing element is integrally formed with the image forming element.

2. Instrument cluster of a car or other vehicle, wherein the instrument cluster comprises a pointing device, wherein the pointing device is mounted rotatable about a rotational axis, wherein the pointing device has a shaft element in the vicinity of the rotation axis, wherein the pointing device further comprises at least one light guide element in the region of the shaft element, wherein the pointing device further comprises an image forming element, wherein the image forming element and the at least one light guide element is able to be rotated about the rotational axis together with the shaft element, wherein light incident to the shaft element is directed from the at least the light guide element to the image forming element, wherein the pointing device further comprises an opaque covering element, wherein a light image is formed by light incident to the shaft element passing from the at least one light guide element through the image forming element, wherein light incident to the shaft element is visible to a user of the instrument cluster only after the light image is formed, and projected from the pointing device, reflected by an appliqué on an instrument cluster towards the user; wherein the pointing device further comprises a focusing element, wherein the focusing element is able to be rotated about the rotational axis together with the shaft element, and wherein incident light is directed from the one of the image forming element to the focusing element before the light image is projected from the pointing device, the image forming element and the one of the light guide element are integrally formed with the shaft element and the focusing element is integrally formed with the image forming element.

3. Pointing device according to claim 1 wherein the covering element is visible during daylight lighting conditions, preventing the pointing device from being completely visible when there is a reduced ambient lighting from an exterior of the vehicle, and wherein the light image reflected on the appliqué is only visible to a driver when there is the reduced ambient lighting from the exterior of the car or other vehicle.

4. Pointing device according to claim 1, wherein the light guide element comprises a mirror, the image forming element comprises an aperature and the covering element comprises a shroud.

5. Pointing device for an instrument cluster of a car or other vehicle, wherein the pointing device is mounted rotatable about a rotation axis, wherein the pointing device has a shaft element in the vicinity of the rotation axis, wherein the pointing device further comprises at least one light guide element in the region of the shaft element, wherein the pointing device further comprises an image forming element, wherein the image forming element and the light guide element are able to be rotated about the rotational axis with the shaft element, wherein light incident to the shaft element is directed from the at least one light guide element to the image forming element, wherein the pointing device further comprises an opaque covering element, wherein a light image is formed by light incident to the shaft element passing from the light guide element through the image forming element, wherein light incident to the shaft element is visible to a user of the instrument cluster only after the light image is formed, and projected from the pointing device, reflected by an appliqué towards the user; wherein the pointing device further comprises a focusing element, wherein the focusing element is able to be rotated about the rotational axis together with the shaft element, and wherein incident light is directed from the one of the image forming element to the focusing element before the light image is projected from the pointing device, the image forming element and the one of the light guide element are integrally formed with the shaft element and the focusing element and the image forming element are integrally formed with the at least one light guide element.

6. Pointing device according to claim 5 wherein the covering element is visible during daylight lighting conditions, preventing the pointing device from being completely visible when there is a reduced ambient lighting from an exterior of the vehicle, and wherein the light image reflected on the appliqué is only visible to a driver when there is the reduced ambient lighting from the exterior of the car or other vehicle.

7. Pointing device according to claim 5, wherein the light guide element comprises a mirror, the image forming element comprises an aperature and the covering element comprises a shroud.

\* \* \* \* \*

UNITED STATES PATENT AND TRADEMARK OFFICE
CERTIFICATE OF CORRECTION

PATENT NO. : 8,579,448 B2  
APPLICATION NO. : 12/692743  
DATED : November 12, 2013  
INVENTOR(S) : Frens It is certified that error appears in the above-identified patent and that said Letters Patent is hereby corrected as shown below:

Title Page, Item (56)  
U.S. PATENT DOCUMENTS

"6,817,310 B2 11/2004 Sugiyama et al."  
Delete "6,817,310" and insert -- 6,817,610 --

Signed and Sealed this  
Eighteenth Day of February, 2014

Michelle K. Lee  
*Deputy Director of the United States Patent and Trademark Office*